United States Patent
Bay

(10) Patent No.: US 11,650,841 B2
(45) Date of Patent: May 16, 2023

(54) DATA MOVER

(71) Applicant: WALMART APOLLO, LLC, Bentonville, AR (US)

(72) Inventor: Kamil Bay, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 345 days.

(21) Appl. No.: 17/247,059

(22) Filed: Nov. 25, 2020

(65) Prior Publication Data

US 2021/0157629 A1  May 27, 2021

Related U.S. Application Data

(60) Provisional application No. 62/940,286, filed on Nov. 26, 2019.

(51) Int. Cl.
| | |
|---|---|
| *G06F 9/455* | (2018.01) |
| *G06F 9/48* | (2006.01) |
| *G06F 9/451* | (2018.01) |
| *G06F 16/27* | (2019.01) |
| *G06F 16/22* | (2019.01) |
| *G06F 16/215* | (2019.01) |
| *G06F 16/23* | (2019.01) |

(52) U.S. Cl.
CPC ......... *G06F 9/45558* (2013.01); *G06F 9/451* (2018.02); *G06F 9/485* (2013.01); *G06F 16/215* (2019.01); *G06F 16/2282* (2019.01); *G06F 16/2343* (2019.01); *G06F 16/27* (2019.01); *G06F 2009/45583* (2013.01); *G06F 2009/45591* (2013.01)

(58) Field of Classification Search
CPC .................................................. G06F 9/45558
See application file for complete search history.

(56) References Cited

U.S. PATENT DOCUMENTS

| | | |
|---|---|---|
| 7,849,049 B2 | 12/2010 | Langseth et al. |
| 7,962,458 B2 | 6/2011 | Holenstein et al. |
| 8,996,484 B2 * | 3/2015 | Rowley ............... G06F 16/1837 707/704 |
| 9,201,558 B1 | 12/2015 | Dingman et al. |

(Continued)

OTHER PUBLICATIONS

"PowerCenter: Enterprise Data Integration Platform", Informatica, Jul. 4, 2019, https://www.informatica.com/products/data-integration/powercenter.html#fbid=j9os2FOYYM9, 10 pages.

(Continued)

*Primary Examiner* — Charlie Sun
(74) *Attorney, Agent, or Firm* — Patterson Thuente, P.A.

(57) ABSTRACT

Systems and methods for data replication. A data processing service can present a user interface configured to receive a data fusion algorithm from a user, and a request to execute a job, each job including instructions to copy data from one of a plurality of source databases to one of a plurality of target databases, and can present a plurality of virtual machines, each virtual machine comprising: a processing unit configured to attempt to start the job requested by the user, when the job can be started, lock the job from the rest of the plurality of virtual machines, and execute the job according to the data fusion algorithm using a random access memory (RAM) memory bucket.

20 Claims, 14 Drawing Sheets

(56) References Cited

U.S. PATENT DOCUMENTS

2011/0295795 A1 12/2011 Venkatasubramanian et al.
2019/0197174 A1 6/2019 Kim et al.

OTHER PUBLICATIONS

"Informatica PowerCenter—Beginner to Expert Level", Udemy, Jul. 4, 2019, https://www.udemy.com/informatica-powercenter-961-beginners-to-advanced/, 6 pages.
"Meet Alooma. The Enterprise Data Pipeline", Enterprise Data Pipeline Platform, Jul. 4, 2019, https://www.alooma.com, 5 pages.
"Modern ETL", ETL Solutions | Alooma, Jul. 4, 2019, https://www.alooma.com/solutions/modern-etl, 9 pages.
"Pentaho Data Integration", Accelerate Data Pipeline | Hitachi Vantara, Jul. 5, 2019, https://www.hitachiyantara.com/en-us/products/big-data-integration-analytics/pentabo-data-integration.html?source=pentaho-redirect, 11 pages.
"Snowflake Data Warehouse—Key Features", Hevo Blog, Jul. 5, 2019, https://hevodata.com/blog/snowflake-data~warehouse-features/, 8 pages.

\* cited by examiner

| STEP | TYPE | FROM | TO | AT | LOGIC | ON ERROR |
|---|---|---|---|---|---|---|
| 1 | MOVE | ORACLE | TERADATA | NA | CUSOM LOGIC | RESUME |
| 2 | MOVE | HADOOP | ORACLE | NA | CUSOM LOGIC | HALT |
| 3 | LOGIC | NA | NA | MYSQL | CUSOM LOGIC | RESUME |
| 4 | MOVE | ORACLE | TERADATA | NA | CUSOM LOGIC | HALT |
| 5 | LOGIC | NA | NA | SQL SERVER | CUSOM LOGIC | RESUME |
| 6 | LOGIC | NA | NA | HIVE | CUSOM LOGIC | HALT |
| 7 | MOVE | ORACLE | TERADATA | NA | CUSOM LOGIC | HALT |

RUN NOW

RUN ON SCHEDULE (EVERY DAY AT 10 AM)

EMAIL LOGS TO: myemail@walmart.com
EMAIL REPORTS TO: myemail@walmart.com

FIG. 5

DATA MOVER

RELATED APPLICATIONS

This application claims benefit of priority to Provisional Patent Application No. 62/940,286, filed Nov. 26, 2019, of which is hereby fully incorporated herein by reference.

TECHNICAL FIELD

Embodiments relate generally to databases and, more particularly, to data replication between databases.

BACKGROUND

Most data science (statistics, analytics, finance) teams work with data that is scattered across multiple different data sources, including relational and NoSQL databases. For efficient data analysis, financial reporting, and accurate analytical insights, it is important to consolidate data in specific locations, sometimes referred as "data fusion" (not to be confused with "database migration"). For example: payments data from Oracle need to be replicated in a Teradata database; associate data from DB2 needs to be replicated in Hadoop for the last quarter; asset protection data from a SQL Server for the latest month needs to be replicated in SAP Hana. This "data replication" or "data fusion" task is very involved and requires the knowledge of particular database specifics as well as decent programming skills. Additionally, such tasks require computational resources, a robust scheduling unit, no single point of failure mechanism, and logging, etc. For a team of Statisticians, Data Scientists, Analysts, or Finance individuals, who are typically not programmers, this becomes a difficult task. Often, such teams reach out to IT support, which in turn results in added cost and time. Therefore, there is a need for "data replication" or "data fusion" across databases without requiring programming by a user.

Further, there exists a problem in efficiency for batch read-writes. Databases typically place restrictions on how fast data is allowed to be read or written. For example, a source database will not allow reads faster than the particular configuration of the source database. A target database will not accept data faster than the specific target database allows. This problem is often addressed by implementing a temporary file, which is slow and inefficient. Therefore, there is a further need to optimize batch read-writes.

SUMMARY

Embodiments of the present disclosure substantially meet the aforementioned needs of the industry. Embodiments of the present disclosure provide a web application configured to run on a cluster of virtual machines (VMs). Embodiments allow Data Science and Analytics teams to schedule and design complex extract, transform, load (ETL) workflows, as well as other reporting functionality. Thus, "coding effort" is minimized, while best-in-class functionality in terms of speed and efficiency is achieved. Embodiments provide easy-to-use, yet powerful, functionality to move data between databases with maximum speed without the user writing any code.

In an embodiment, data from originating data sources (plural) is replicated in the target data sources (plural). Thus, data comes from and goes to multiple data sources (e.g. both relational and NoSQL databases). Both originating and target data sources remain fully operational during the process. A user can set an algorithm (by specifying the "steps"), a custom schedule (e.g. daily), a custom emailing, or a custom reporting. Data replication services execute the data fusion process as designed by the user. All logs and messages are output to a console for the user to review. The user can control the workflow and terminate the process at any time. In embodiments, a user can include custom logic within the "steps," as well as receive custom reporting in email.

In an embodiment, a system for data replication comprises computing hardware of at least one processor and memory operably coupled to the at least one processor; and instructions that, when executed on the computing hardware, cause the computing hardware to implement: a user interface configured to receive a data fusion algorithm from a user, and a request to execute a job from a plurality of jobs, each of the jobs including instructions to copy data from one of a plurality of source databases to one of a plurality of target databases, and a plurality of virtual machines, each virtual machine comprising: a processing unit configured to: attempt to start the job requested by the user, when the job can be started, lock the job from the rest of the plurality of virtual machines, and execute the job according to the data fusion algorithm using a random access memory (RAM) memory bucket.

In an embodiment, a method of data replication comprises receiving, through a graphical user interface from a user, a data fusion algorithm and a request to execute a job from a plurality of jobs, each of the jobs including instructions to copy data from one of a plurality of source databases to one of a plurality of target databases; presenting a plurality of virtual machines, each virtual machine configured with a processing unit; attempting to start the job requested by the user using one of the plurality of virtual machines; when the job can be started, locking the job from the rest of the plurality of virtual machines, and executing the job according to the data fusion algorithm using a random access memory (RAM) memory bucket.

In an embodiment, a method of optimized communication between a source database and a target database comprises generating an optimized timeslot during a read-write operation between the source database and the target database by: reading a first result set of data from the source database, writing the first result set of data to the target database using a direct push, while writing the first result set of data to the target database, reading a second result set of data from the source database.

In a feature and advantage of embodiments, an optimized timeslot is created for data replication. For example, in a read-write operation between a source database and a target database, a first result set of data can be read from the source database, the first result set of data can then be written to the target database using a direct push, and, while the first result set of data is being written to the target database, a second result set of data can be read from the source database. This creates an optimized timeslot in which the read-write is faster than if done serially. In an embodiment, the second result set of data is read at a maximum read speed allowed by the source database, and the second result set of data is written at a maximum write speed allowed by the target database.

In another feature and advantage of embodiments, higher speed is achieved than in traditional ETL systems. In an embodiment, the systems and methods are configured for a direct database connection. Further, a higher speed is achieved by copying without using any temporary local files. For example, a RAM memory bucket is utilized starting from the second read. Operations on an array of objects in RAM is instantaneous compared to operations on a temp file or database.

In an embodiment, upon initial read, the first batch does not use a memory bucket because as data is read, each row from the source database can be directly pushed to the target database. However, when pushed to the target database, little batches are formed, awaiting an execute update. When an execute update is submitted, traditionally, that is when time is lost because waiting until the target database returns batch complete response was required. However, as described herein, when the execute update is submitted, reading the second batch into the memory bucket is also commanded, which is more efficient than the waiting required of the traditional method.

In another feature and advantage of embodiments, systems are data-source agnostic. For example, the system does not force a user to implement additional data types, and can work with any data source. In an embodiment, a Java Database Connectivity (JDBC) driver is utilized to recognize various data types.

In another feature and advantage of embodiments, robustness is improved over traditional systems. For example, a web application is stateless and scalable. The web application can be deployed on a cluster of virtual machines, which allow capacity to be increased dynamically. In an embodiment, a simple Web Application Resource or Web application Archive (WAR) file can be deployed on a desktop or cloud. The WAR file is platform-agnostic because the Java-based implementation can be deployed on Windows, UNIX, LINUX, etc. Accordingly, the same WAR file can be deployed on as many clusters as desired, which increases the power of the implementation.

In another feature and advantage of embodiments, usability is improved over traditional systems. In an embodiment, no coding is required by the users. Operations can be implanted via "drag and drop." Accordingly, non-technical users can generate the same data replication as coders. In another example, mapping database tables to data structures is time-consuming and difficult. Embodiments utilize a JDBC driver, which is already programmed to select appropriate data types between databases.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 5 is a screenshot of a user interface for custom algorithm creation, according to an embodiment.

Figure 1:
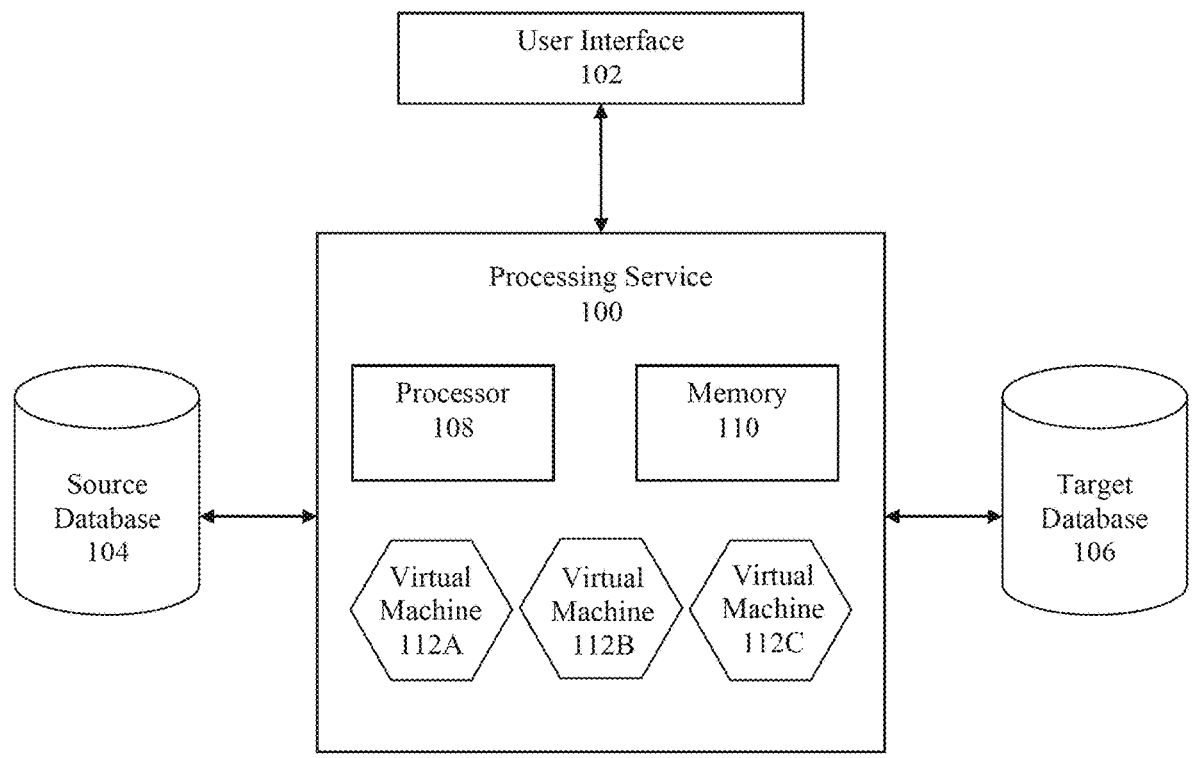
FIG. 1 is a block diagram of a system for data replication, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, a block diagram of a system for data replication is depicted, according to an embodiment. The system of FIG. 1 generally comprises a processing service 100 and a user interface 102. As will be described, processing service 100 can be utilized to implement optimized batch data replication from a source database 104 to a target database 106.

Embodiments of the system, and the corresponding methods of configuring and operating the system, can be performed in cloud computing, client-server, or other networked environment, or any combination thereof. The components of the system can be located in a singular "cloud" or network, or spread among many clouds or networks. End-user knowledge of the physical location and configuration of components of the system is not required.

Some of the subsystems of the system include various engines or tools, each of which is constructed, programmed, configured, or otherwise adapted, to autonomously carry out a function or set of functions. The term engine or unit as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Processing service 100 generally comprises a processor 108, a memory 110, and a plurality of virtual machines 112 (as depicted, virtual machine 112A, virtual machine 112B, and virtual machine 112C).

Processor 108 can be any programmable device that accepts digital data as input, is configured to process the input according to instructions or algorithms, and provides results as outputs. In an embodiment, processor 108 can be a central processing unit (CPU) configured to carry out the instructions of a computer program. Processor 108 is therefore configured to perform at least basic arithmetical, logical, and input/output operations.

Memory 110 can comprise volatile or non-volatile memory as required by the coupled processor 108 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

Each of the plurality of virtual machines 112 comprises a virtual environment that functions as a virtual computer system. Each of the plurality of virtual machines has its own virtual CPU, memory, network interface, and storage, created using the physical resources of processing service 100 (e.g. processor 108 and memory 110). In an embodiment, the plurality of virtual machines 112 can be system virtual machines that provide a substitute for a real machine, or process virtual machines that execute computer programs in a platform-independent environment.

User interface 102 comprises a graphical user interface to allow a user to interact with processing service 100. For example, the user can command processing service 100 to replicate data from a source database to a target database using a user-specified algorithm or procedure. Accordingly, user interface 102 is configured to receive a data fusion algorithm from a user. In an embodiment, user interface 102 is configured to receive a request to execute a job from a plurality of jobs, wherein each of the jobs including instructions to copy data from one of a plurality of source databases to one of a plurality of target databases. In an embodiment, results or job status can be reported to the user with user interface 102.

Source database 104 and target database 106 can be configured to store data. Source database 104 and target database 106 can each be a general purpose database management storage system (DBMS) or relational DBMS as implemented by, for example, Oracle, IBM DB2, Microsoft SQL Server, PostgreSQL, MySQL, SQLite, Linux, or Unix solutions, or NOSQL database, in embodiments. Accordingly, virtual machines 112 can read from source database 104 and write to target database 106. Where appropriate, virtual machines 112 can likewise read from target database 106 and write to source database 104.

Figure 2:
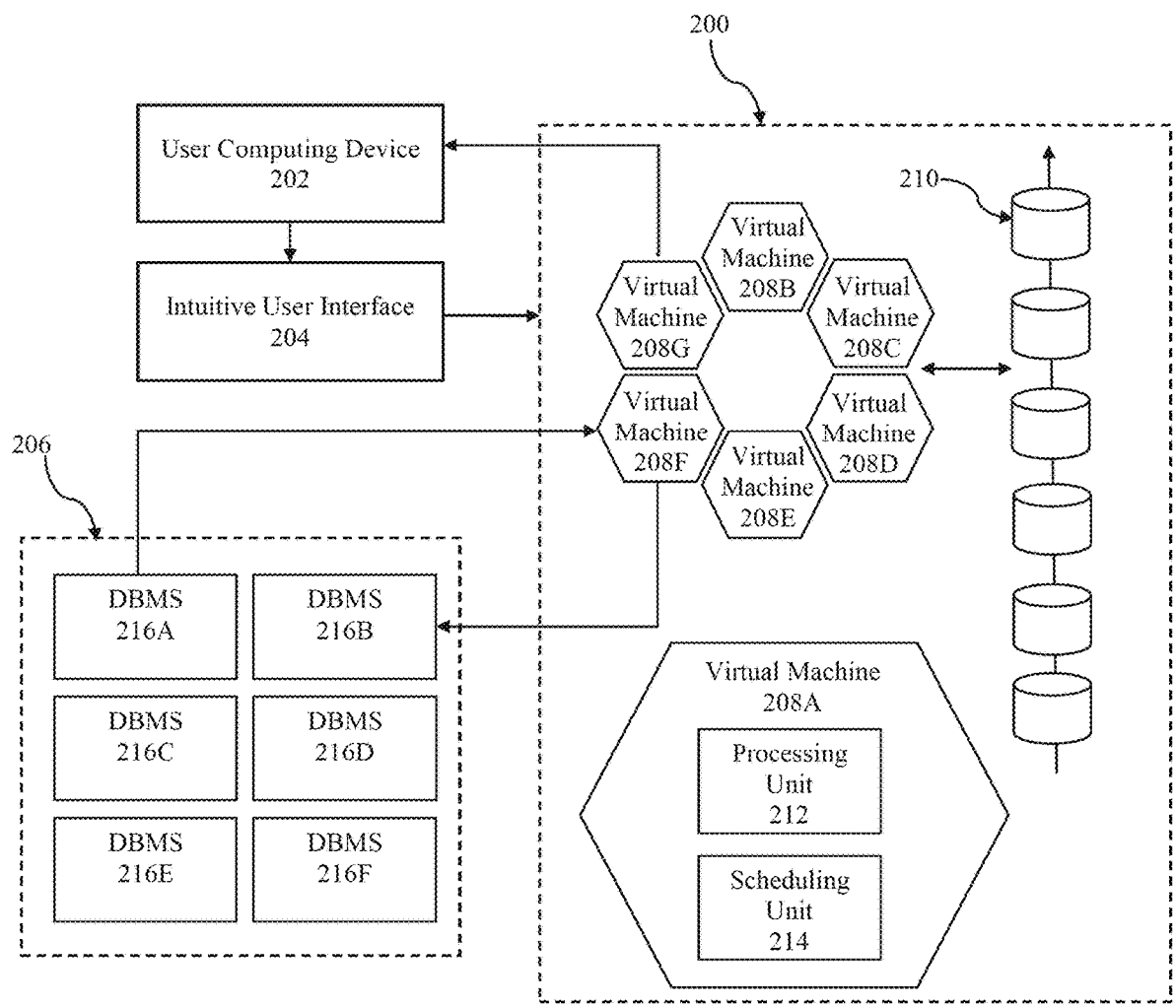
FIG. 2 is a further block diagram of the system for data replication of FIG. 1, according to an embodiment.

Referring to FIG. 2, a further block diagram of the system for data replication of FIG. 1 is depicted, according to an embodiment. For ease of explanation, new element numbering is used, but one of skill in the art will appreciate that the components of FIG. 1 can correspondingly reflect the components of FIG. 2, and vice versa. The system generally comprises a data processing service 200, a user computing device 202, a user interface 204, and a plurality of databases (data sources and data targets) 206.

Data processing service 200 generally comprises a plurality of virtual machines 208 and a backend data management service 210.

Each of the plurality of virtual machines 208A-208G generally comprises a processing unit 212 and a scheduling unit 214. As will be described, because each virtual machine 212 includes its own processing unit 212 and its own scheduling unit 214, which guarantees no single point of failure. In FIG. 2, virtual machine 208A is depicted in further detail, but one skilled in the art will readily appreciate that corresponding virtual machines 208B-208G are similarly implemented.

In an embodiment, processing unit 212 is configured to process a data replication job according to a particular algorithm specified by the user. In an embodiment, processing unit 212 is configured to attempt to start a job requested by a user, and, when the job can be started, lock the job from the rest of the plurality of virtual machines. In embodiments, a job can be locked by semaphor, mutex, flag, or other access-locking or indication mechanism. Processing unit 212 is configured to execute the job using a RAM memory bucket (as will be described). More particularly, the first VM that can start the job locks the job, and proceeds to main algorithm execution. Processing unit 212 is further configured to parse and validate the user-submitted algorithm, as will be described.

In an embodiment, scheduling unit 214 is configured to monitor job status by checking the status of the plurality of jobs and presenting the status to the user through the user interface.

In an embodiment, scheduling unit 214 is configured to monitor job status at varying intervals, such as every 1 second, 30 seconds, 1 minute, or longer. In an embodiment, monitoring frequency can be configured based on the particular virtual machine, job, and/or database. In an embodiment, scheduling unit 214 is further configured determine that certain jobs are overdue and assign overdue jobs to another of plurality of virtual machines 208 based on the monitoring of job status.

In embodiments, processing unit 212 and scheduling unit 214 are contained in one core file (e.g. a WAR file).

Backend data management service 210 comprises a database-agnostic service to manage plurality of virtual machines 208. In an embodiment, backend data management service 210 can be implemented by, for example, MariaDB or a Galera cluster. Backend data management service 210 allows scheduling unit 214 to monitor current job status and health values. In embodiments, once a batch or job is executed, each virtual machine 208 pings backend data management service 210 to update backend data management service 210 data. In embodiments, the connection between virtual machines 208 and backend data management service 210 is via Hypernet.

User computing device 202 comprises a computing device such as a desktop computer or mobile device accessible by the user to interact with data processing service 200. In an embodiment, a user can access data processing service 200 via user interface 204. In an embodiment, user interface 204 can be a graphical user interface. User interface 204 can be utilized to generate or create a data fusion algorithm. In particular, a user can utilize user interface 204 to submit requests in the form of "jobs." Each job can be customized to include a custom algorithm and a custom schedule. In an embodiment, a log and custom reporting email can be optionally transmitted back to user computing device 202 to report the results of the job or data fusion algorithm status via user interface 204.

Plurality of databases 206 can include both relational and NOSQL data sources, as described above with respect to FIG. 1. As depicted, virtual machine 208F is reading data from DBMS 216A and writing to DBMS 216B, but any of virtual machines 208 can operate on any of databases 206. Further, multiple virtual machines 208 can operate on the same DMBS 216 at the same time (or as the timing of the database allows). As will be described with respect to operation with a memory bucket and optimized timeslot, data read by virtual machine 208F from DBMS 216A is pushed immediately to DBMS 216B to allow for maximum processing speed.

Figure 3:
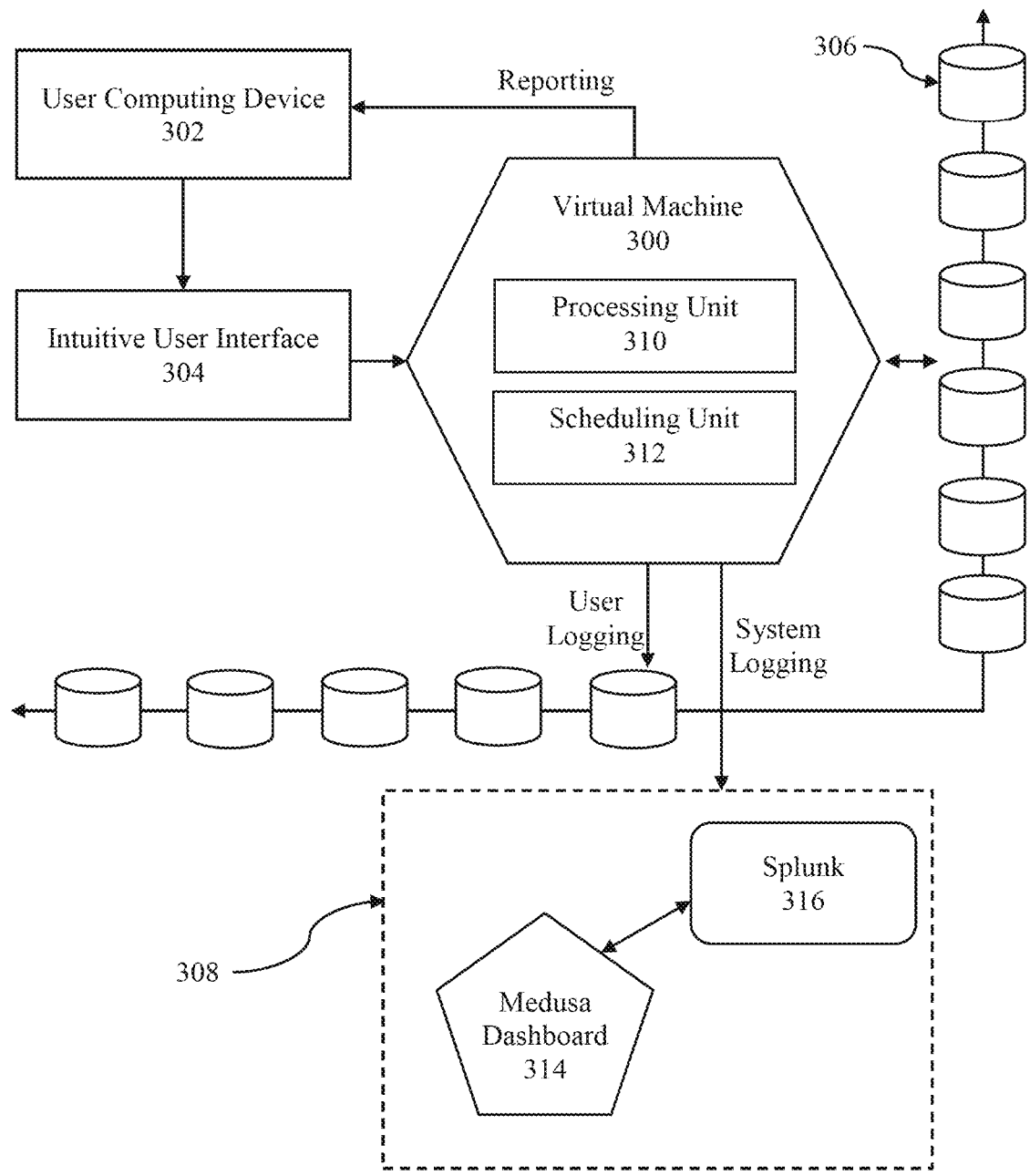
FIG. 3 is a block diagram of a system for data replication, according to an embodiment.

Referring to FIG. 3, a block diagram of a system for data replication is depicted, according to an embodiment. For ease of explanation, new element numbering is used, but one of skill in the art will appreciate that the components of FIGS. 1-2 can correspondingly reflect the components of FIG. 3, and vice versa.

The system generally comprises a virtual machine 300, a user computing device 302, a user interface 304, and a backend data management service 306. Source and target databases are intentionally omitted from FIG. 3 for ease of illustration.

Similar to the virtual machines described above with respect to FIG. 2, virtual machine 300 comprises a processing unit 310 and a scheduling unit 312. Likewise, user computing device 302 and user interface 304 can be configured to facilitate generation of a data fusion algorithm by a user. Further, backend data management service 306 comprises a database-agnostic service to manage virtual machine 300.

The system of FIG. 3 further comprises a health check subsystem 308. As depicted, health check subsystem 308 comprises a Medusa dashboard 314 and a Splunk logging platform 316.

In operation of FIG. 3, the first VM (processing unit 310) able to start processing a job locks the job in backend data management service 306. Thus, no other VM will attempt to start the job. In an embodiment, this lock is active until the job execution is finished. Scheduling unit 312 checks job status (for all jobs locked by processing unit 310) every second to make sure all jobs are up-to-date. In certain embodiments prior to, during, and/or after job execution, processing unit 310 is configured to log job data to backend data management service 306 and Splunk logging platform 316. As depicted in FIG. 3, user logging data is pushed to backend data management service 306 and system logging data is pushed to health check subsystem 308. Via user interface 304, a user can monitor job execution and examine logs in real time. A user can also terminate execution at any time. System and job health can be reported back to user computing device 302 or viewed in Medusa dashboard 314.

A user can opt out of reporting via email, in which case all the logs are kept in user interface 304.

Accordingly, VMs work in tandem without any conflict. Because each VM includes a scheduling unit, once a particular VM acquires a job, other VMs cannot work on that job. In embodiments, to acquire a job, any free VM that captures the job starts working on the job in a first-come, first-served basis.

Figure 4:
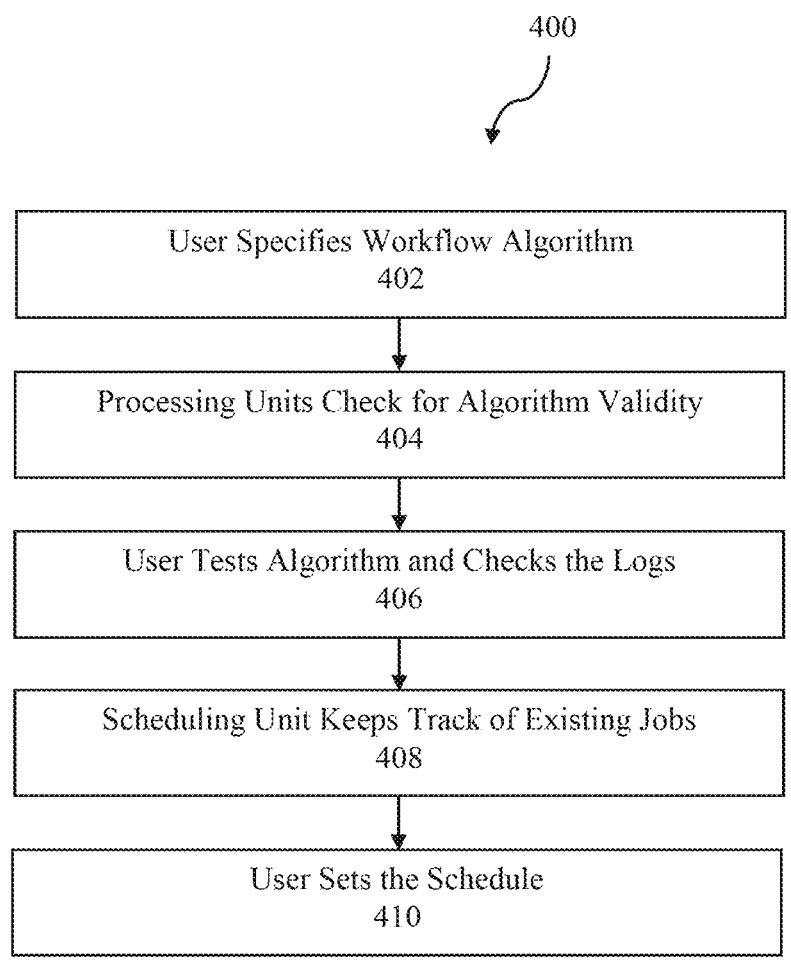
FIG. 4 is a flowchart of a method for data replication with a data mover, according to an embodiment.

Referring to FIG. 4, a flowchart of a method 400 for data replication with a data mover is depicted, according to an embodiment. In embodiments, method 400 can be implemented by the systems depicted in FIGS. 1-3, but reference will be made with respect to the components of FIG. 2 for illustration.

At 402, a user specifies a workflow algorithm. For example, a user can specify a workflow algorithm using user computing device 202 and user interface 204. In embodiments, a graphical user interface allows the user to select and de-select data replication components and commands, which taken together, define the workflow algorithm.

For example, referring to FIG. 5, a screenshot of a user interface for custom algorithm creation is depicted, according to an embodiment. More particularly, FIG. 5 depicts a simple and intuitive graphical user interface to create a custom algorithm. In particular, data operations are presented step-by-step. For example, step 1 is to move a data chunk from "Oracle" to "Teradata." If step 1 encounters an error, then "resume" execution, i.e. go on to the next step is set. Step 2 is to move a data chunk from "Hadoop" to "Oracle." If step 2 encounters an error, then execution is halted or terminated. Step 3 is to execute custom login in MySQL. If step 3 encounters an error, then "resume" execution is set, and so on. In embodiments, the GUI provides charts and graphs to help the user visually understand the status of all jobs set within a team, and the status of each individual job.

Referring again to FIG. 4, at 404, a processing unit evaluates the validity of the user-specified algorithm. For example, processing unit 212 can analyze the workflow algorithm submitted at 402 to determine whether it has appropriate data replication commands.

At 406, a user can test the algorithm and check logs. For example, a user operating user computing device 202 via user interface 204 can test the algorithm using resources of processing unit 212 to determine its effectiveness in data replication. In an embodiment, an initial test execution of one or more steps of the algorithm can be executed. Further, the user operating user computing device 202 via user interface 204 can evaluate logs such as in backend data management service 210 (or health check subsystem 308) as another check on the algorithm.

At 408, a scheduling unit keeps track of existing jobs. For example, scheduling unit 214 can monitor jobs that its processing unit 212 has locked. In another embodiment or in combination with scheduling unit 214, backend data management service 210 can log all existing jobs as a repository for virtual machines 208.

At 410, a user can set the job schedule. For example, a user operating user computing device 202 via user interface 204 can prioritize certain jobs over others, or otherwise manipulate a job schedule. In an embodiment, backend data management service 210 can provide an overall job schedule for all virtual machines 208.

Note that in FIG. 4, operations 406, 408, and 410 are depicted as executing serially, but can be executed out of order.

Figure 6:
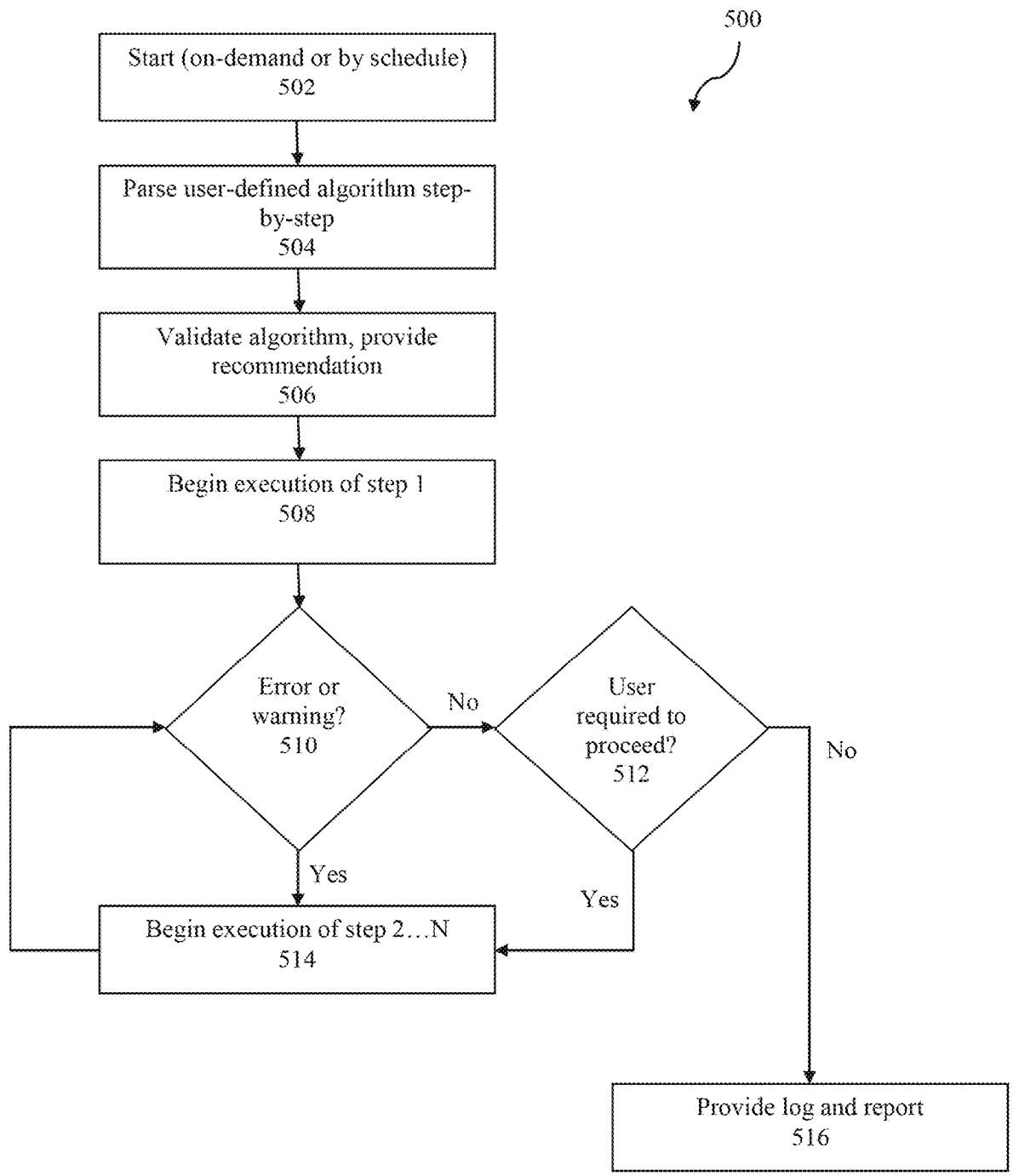
FIG. 6 is a flowchart of algorithm processing, according to an embodiment.

Referring to FIG. 6, a flowchart of algorithm processing 500 is depicted, according to an embodiment. At 502, a job is started (and locked), either on-demand or by schedule. The job can include a user-defined algorithm for data replication.

At 504, the user-defined algorithm is parsed step-by-step. The user-defined algorithm can contain an unlimited number of logical and data move steps. These steps are examined and parsed. At the virtual machine executing the algorithm, the steps are saved as a binary object.

At 506, the algorithm is validated. In an embodiment, each step in the algorithm is validated. When an error is determined in the validation of one of the steps, an alternative step or step component is recommended. For example, a recommendation can be provided for data type, move logic, or error handling. In an embodiment, when an error is a missing table on the target database, the alternative step can include a suggested alternative table.

At 508, the algorithm is executed, starting at step 1. The algorithm is executed from step 1 to step N. In an embodiment, if the user marks step 1 as inactive, then the algorithm skips this step and provides a corresponding log to the user. If the step is marked as active, the algorithm proceeds with execution of step 1. In an embodiment, during algorithm execution, the status of the job is monitored by the health check components and continuously reported to the user.

In an embodiment, at 510, if step 1 execution encounters an error or warning, the error or warning is handled according to the algorithm and the algorithm proceeds to step 2 at 514. If step 1 execution is successful, but requires the user to proceed at 512, the user is presented such a prompt. If the user indicates "proceed," the algorithm proceeds with execution of step 2 to N (final step) at 514. If the user does not wish to proceed, the algorithm is halted and a log is made at 516.

In an embodiment, if errors were encountered during algorithm execution, the errors are reproduced in a log. Embodiments can make recommendations on how to handle errors. For example, a "not enough spool space" error means the user-provided credentials do not have enough authority to execute a certain heavy lifting. Therefore, the user may need to request to increase spool space or provide alternative credentials. Embodiments can then check the "on error resume" flag set by the user (e.g. see FIG. 5). If the value is set to "true," then the software proceeds with execution. If the value is set to "false," execution of the current task is terminated.

Figure 7:
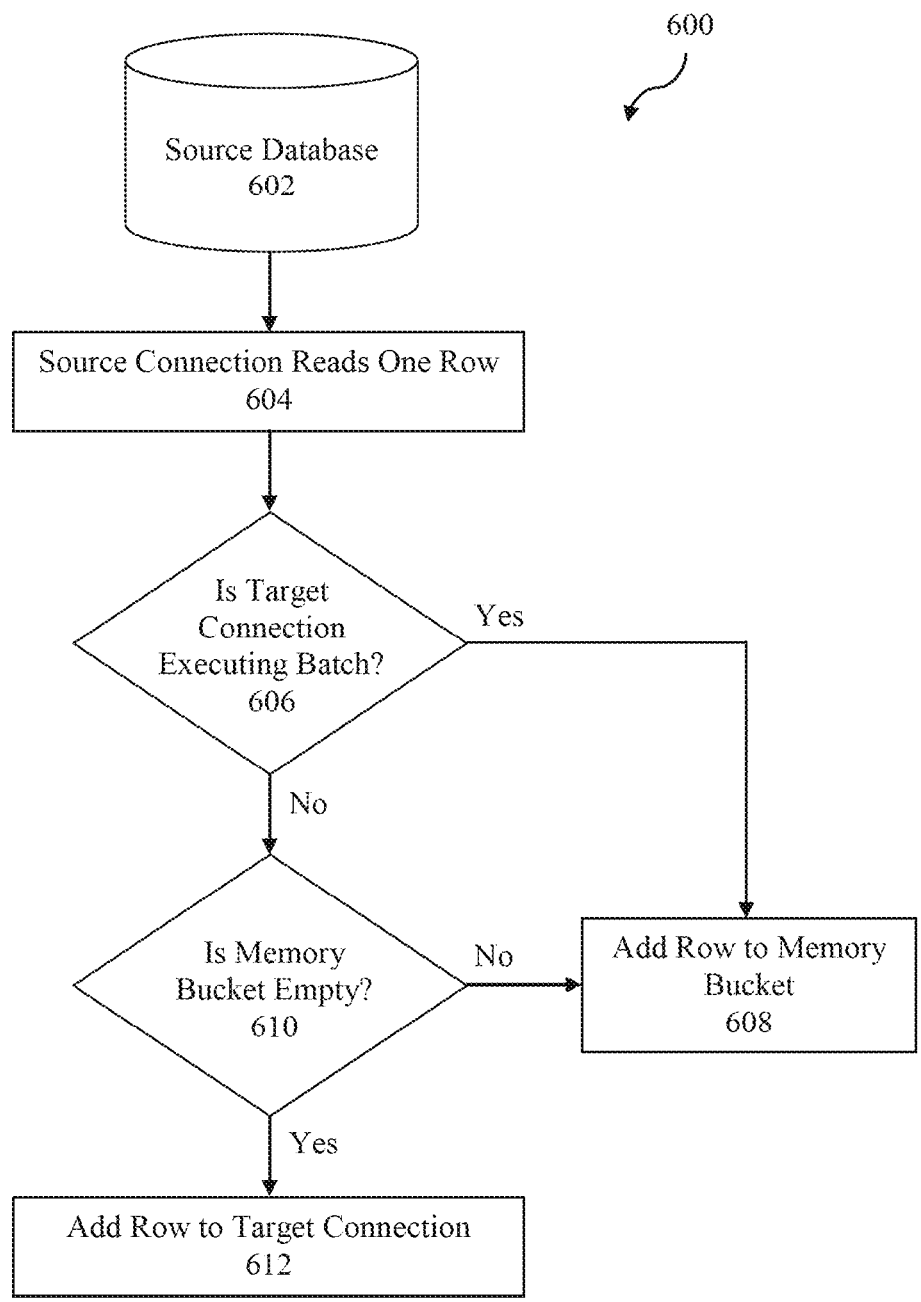
FIG. 7 is a flowchart of a method for database reading utilizing a memory bucket, according to an embodiment.

Referring to FIG. 7, a flowchart of a method 600 for database reading utilizing a memory bucket is depicted, according to an embodiment. In embodiments, a memory bucket and the corresponding optimized timeslot are utilized in a single-threaded environment.

At 602, a source database is presented. At 604, a source connection reads one row from the source database. At 606, a boolean check is made to determine whether the target connection executing a batch operation. If the target connection is executing a batch operation, the row read from the source database at 604 is added to the memory bucket at 608; for example, using List<Object[ ]>. Accordingly, no temporary file is used. If the target connection is not executing a batch operation, a check to determine whether the memory bucket is empty is made at 610. If the memory bucket is empty, the target connection cannot take rows from the memory bucket. Thus, rows can be applied directly from the source connection to the target connection at 612; for example, using an addBatch( ) method. This happens before the first executeBatch( ) method kicks off. If the memory bucket is not empty, the row read from the source database at 604 is added to the memory bucket at 608.

Figure 8:
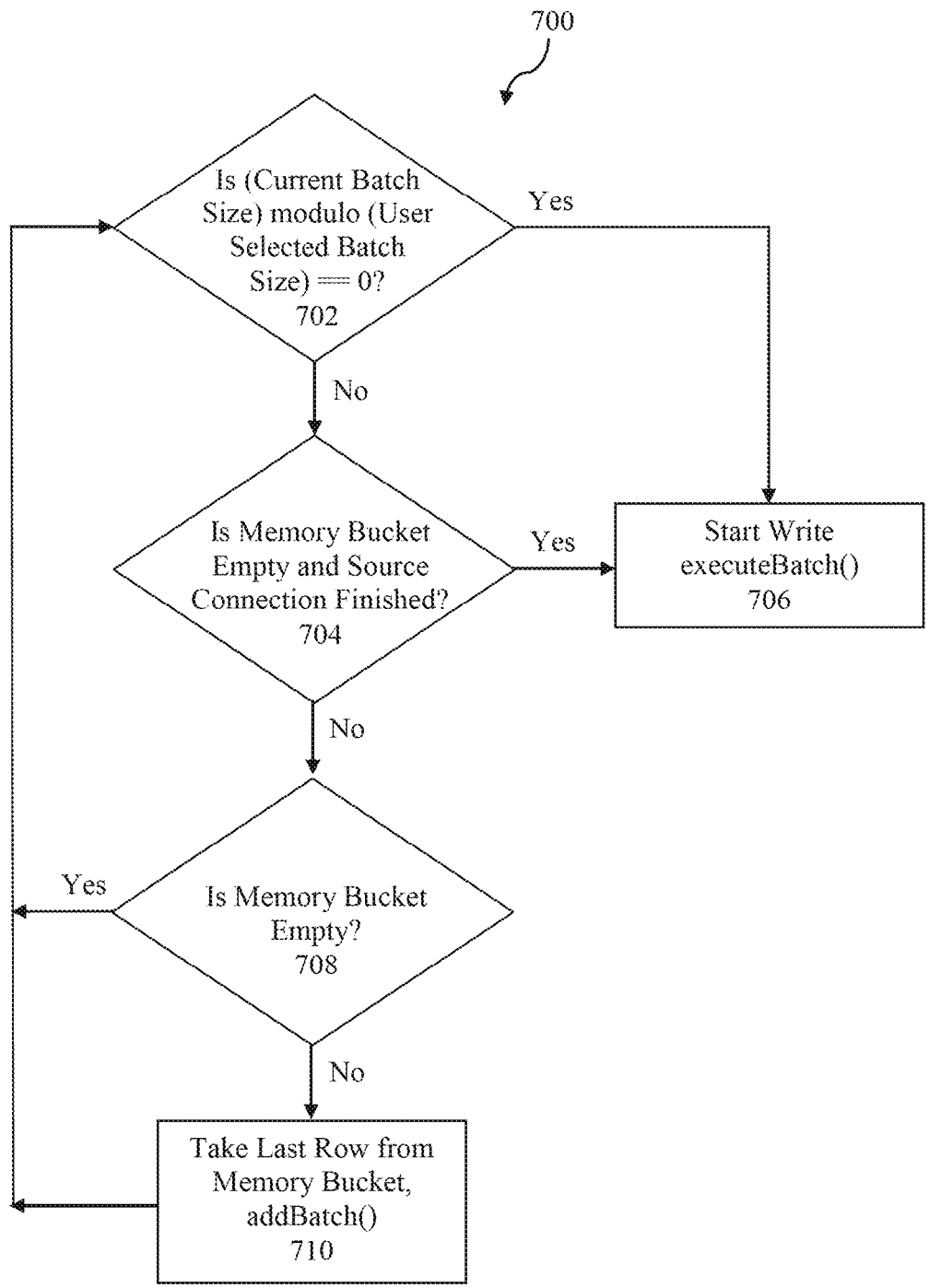
FIG. 8 is a flowchart of a method for database writing utilizing a memory bucket, according to an embodiment.

Referring to FIG. 8, a flowchart of a method 700 for database writing utilizing a memory bucket is depicted, according to an embodiment. At 702, a check is made to determine whether the current batch size modulo the user-selected batch size is equal to zero. If yes, a write can begin at 706.

If no, at 704, a check is made to determine whether the memory bucket is empty and the source connection is finished. For example, a check can be made if the source connection result set pointer has reached the end of its array (or NULL). If yes, write can begin at 706.

If no, at 708, a check is made to determine whether the memory bucket is empty. If yes, method 700 returns to 702.

If no, at 710, the last row from the memory bucket is added using addBatch( ) and method 700 returns to 702.

Method 700 takes time to finish. The timing can be around 10 to 30 seconds per batch, or even minutes depending on database and batch size. This is the essentially the speed with which the target database accepts data, i.e. allows writing of data. In order to achieve maximum speed, while the target database is in the process of "accepting incoming data," i.e. executeBatch( ) method, embodiments keep reading the source database data into a "memory bucket," using List<Object[ ]>. The reason it is desirable to read as much as possible is because the source database data read process also takes time. However, by a "simultaneously read" of source database data into RAM (i.e. memory bucket), then the next batch can be submitted to the target database immediately, once the target database is ready to receive the next batch. Accordingly, time is not wasted reading data. Essentially data read time goes to zero (or near zero). The result is that embodiments are able to read data as fast as the source database allows without interruptions. And, embodiments are able to submit as much data to the target database as the target database allows.

Figure 9:
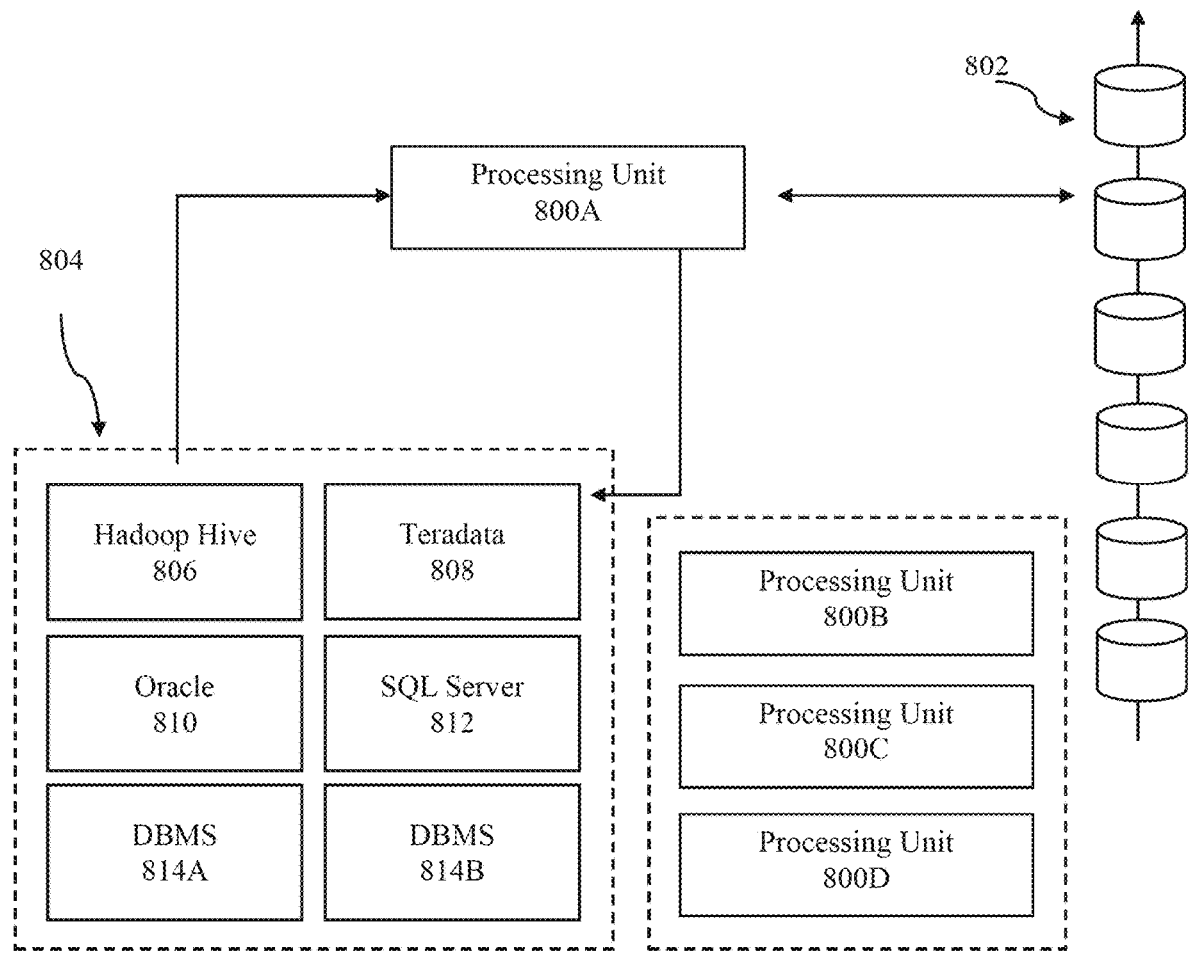
FIG. 9 is a block diagram of a system for pushing chunk data from Hadoop to Teradata, according to an embodiment.

Referring to FIG. 9, a block diagram of a system for pushing chunk data from Hadoop to Teradata is depicted, according to an embodiment. In an embodiment, the system of FIG. 9 comprises a plurality of processing units 800, a backend data management service 802, and a plurality of databases 804 (Hadoop Hive 806, Teradata 808, Oracle 810, SQL Server 812, and so on, including DMBS 814A, and DMBS 814B).

Processing unit 800A is depicted as the exemplary processing unit for data replication, but processing units 800B, 800C, and 800D can operate synchronously in the same way as processing unit 800A.

In an embodiment, processing unit 804A is configured to receive a result set object for the job, convert the result set object from a source database datatype to a target database datatype, and write the result set object to the target database in the target database datatype. For example, a results set from Hadoop Hive 806 can be received by processing unit 804A via a direct read. Processing unit 804A can convert the Hadoop object datatypes to Teradata 808 datatypes. Then, processing unit 804A can immediately push the Teradata-converted data to Teradata 808.

More particularly, this data replication creates an optimized timeslot between a source database and a target database. For example, a first result set of data can be read from the source database. The first result set of data is written to the target database using a direct push. In an embodiment, while writing the first result set of data to the target database, a second result set of data is read from the source database. In an embodiment, a memory bucket comprising an array of objects in random access memory (RAM) can be provided. The second result set can be stored in the memory bucket.

In a further embodiment, the second result set can be written from the memory bucket to the target database using a direct push. While writing the second result set from the memory bucket to the target database, a third result set can be read from the source database. Accordingly, the second result set is read at a maximum read speed allowed by the source database, and the second result set is written at a maximum write speed allowed by the target database.

Accordingly, due to direct the described read-write operation, maximum speed is achieved and volume limitations are eliminated. At a basic level, the data coming from Hadoop 806 is identified as a result set and the result set object datatypes are automatically matched with the target database (e.g. Teradata 808) data types. Data is not kept in any intermediate storage. Rather, data is directly pushed to the target database. This guarantees maximum speed allowed by the originating database read speed and target database write speed.

Embodiments of the system are scalable in that the number of processing units can be adjusted to increase capacity and allow for additional simultaneous data replication and data fusion steps. Synchronization results in independent processing power, such that processing unit 800B executes processing from e.g. Oracle 810 to SQL Server 812, and processing unit 800C executes data replication from DMBS 814A to DMBS 814B. Such scalability and independent processing allows for maximum speed and maximum flexibility for a data replication workflow of any complexity.

Referring to FIGS. 10A-10E, screenshots of user interfaces for a system for data replication are depicted, according to embodiments. The screenshots can be implemented in any of the systems of FIGS. 1-3 and 9 or methods of FIGS. 4 and 6-8.

Figure 10A:
FIGS. 10A-10E are screenshots of user interfaces of a system for data replication, according to embodiments.

In particular, FIG. 10A is a screenshot of a job listing interface. Each job includes scheduled time, last run time, next scheduled run time, job health, status, action, remove option, and group characteristic.

Figure 10B:
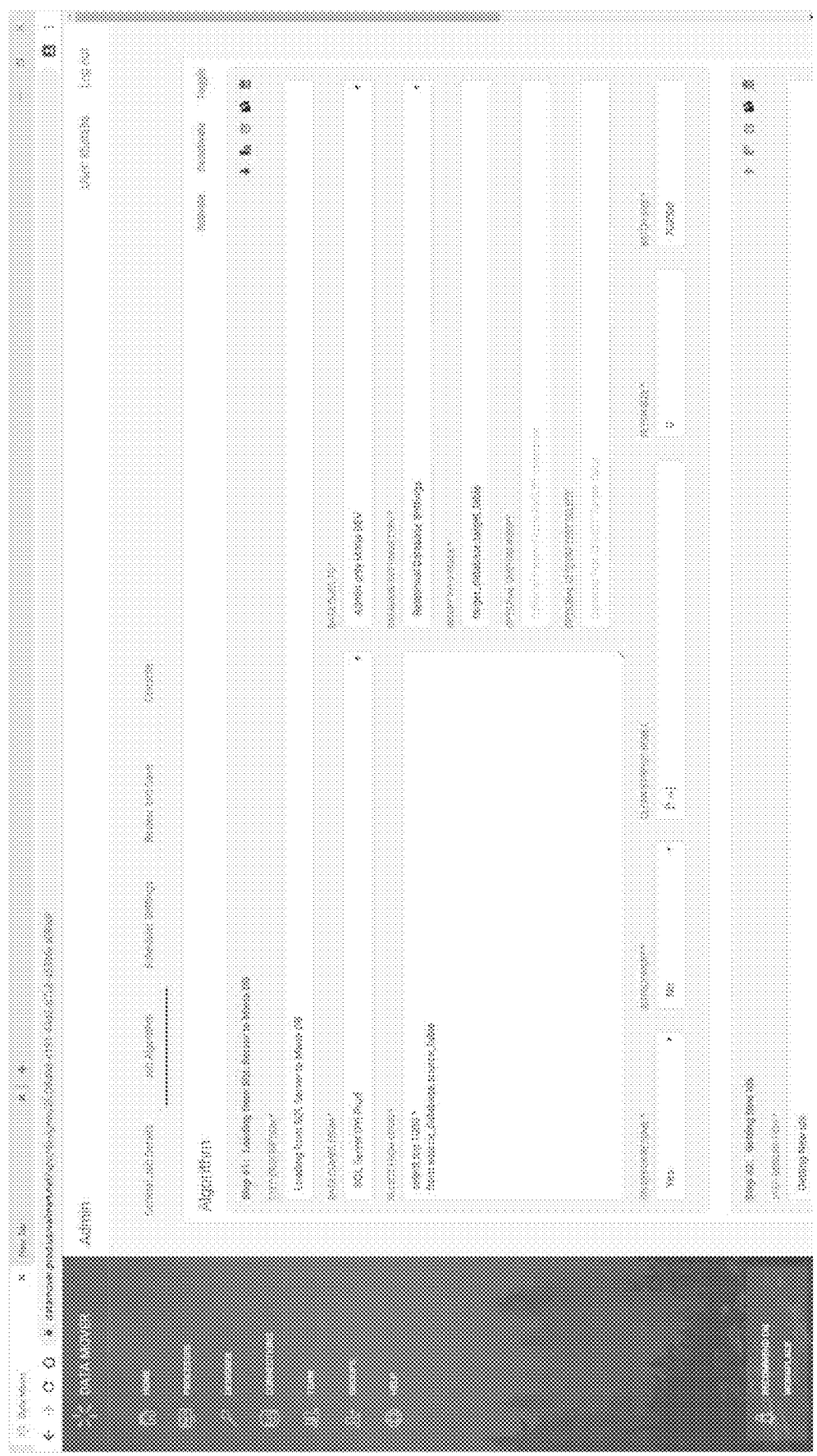

FIG. 10B is a screenshot of a job creation interface. A result set of the "Select From Logic" input box (from the source database) will be "moved" over to the table indicated in the "Insert Into Table" input box (the target database). No data type mapping is needed, as datatyping is all handled automatically for automatic JDBC data type detection and Hibernate.

Figure 10C:
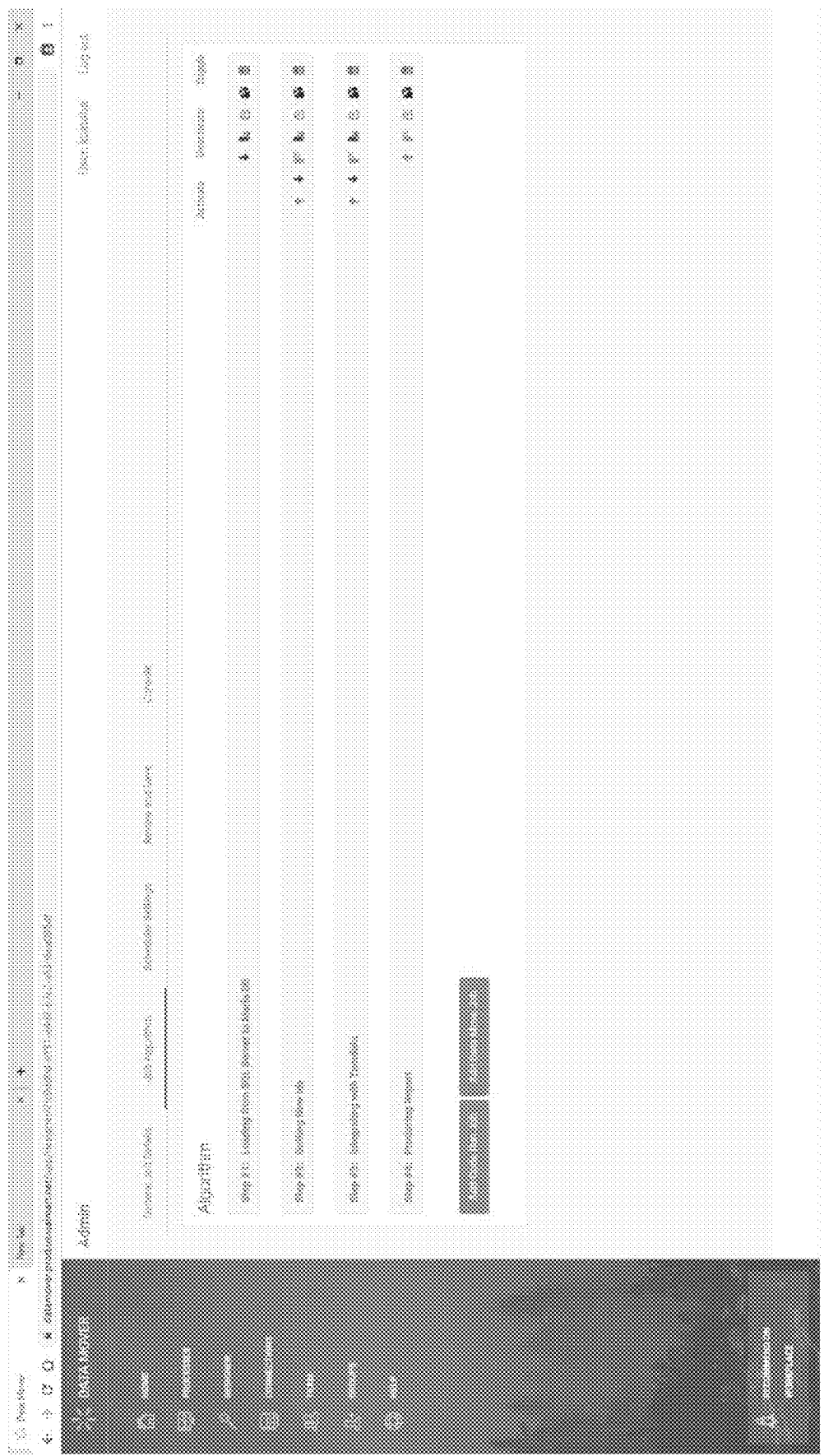

FIG. 10C is a screenshot of a job algorithm interface. For example, step 1 is loading from SQL Server to Maria DB. Step 2 is getting new IDs. Step 3 is integrating with Teradata. Step 4 is producing a report.

Figure 10D:
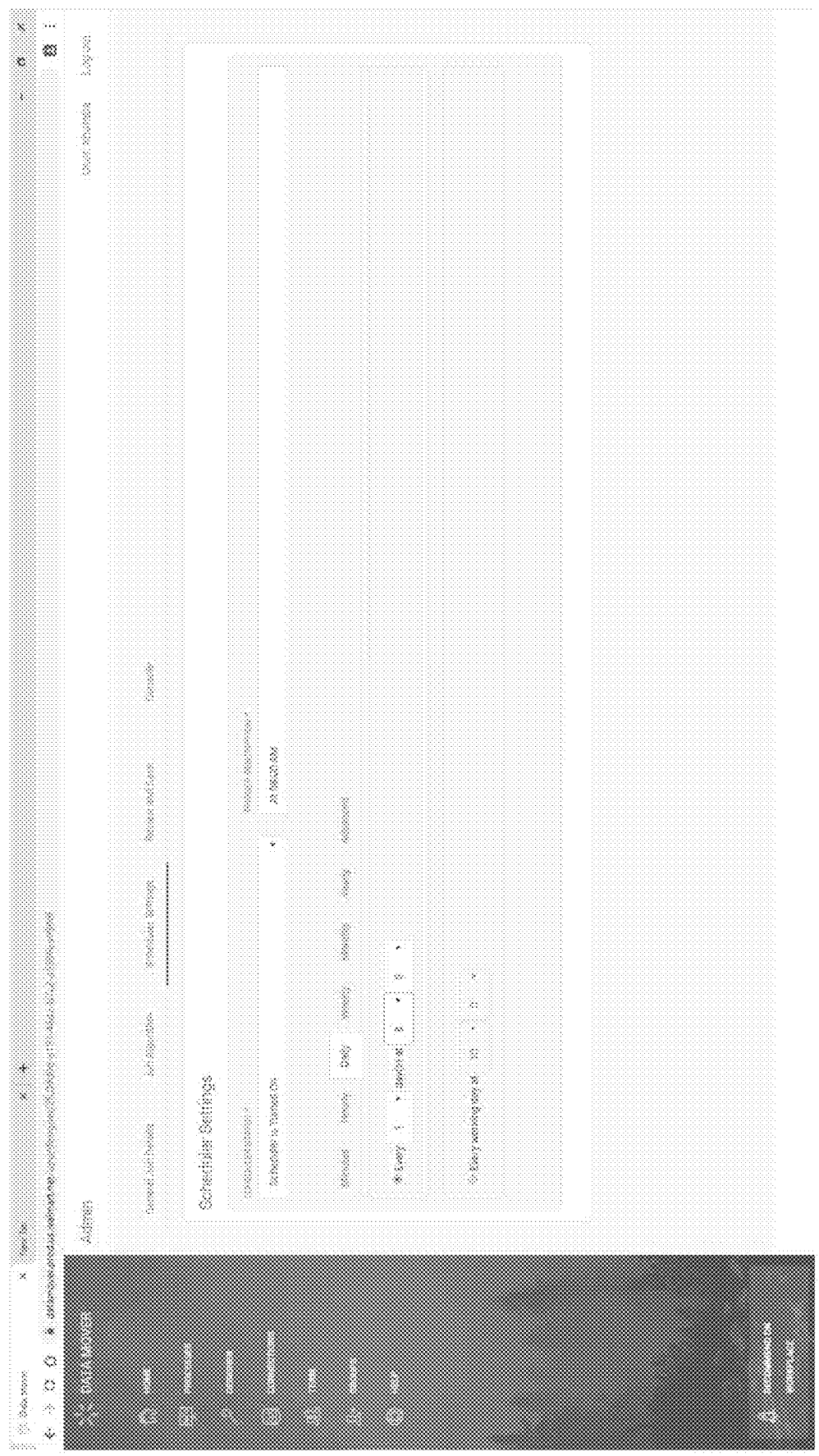

FIG. 10D is a screenshot of a scheduler interface. The scheduler interface allows the user to set a custom schedule (as depicted, every day at 8 AM).

Figure 10E:
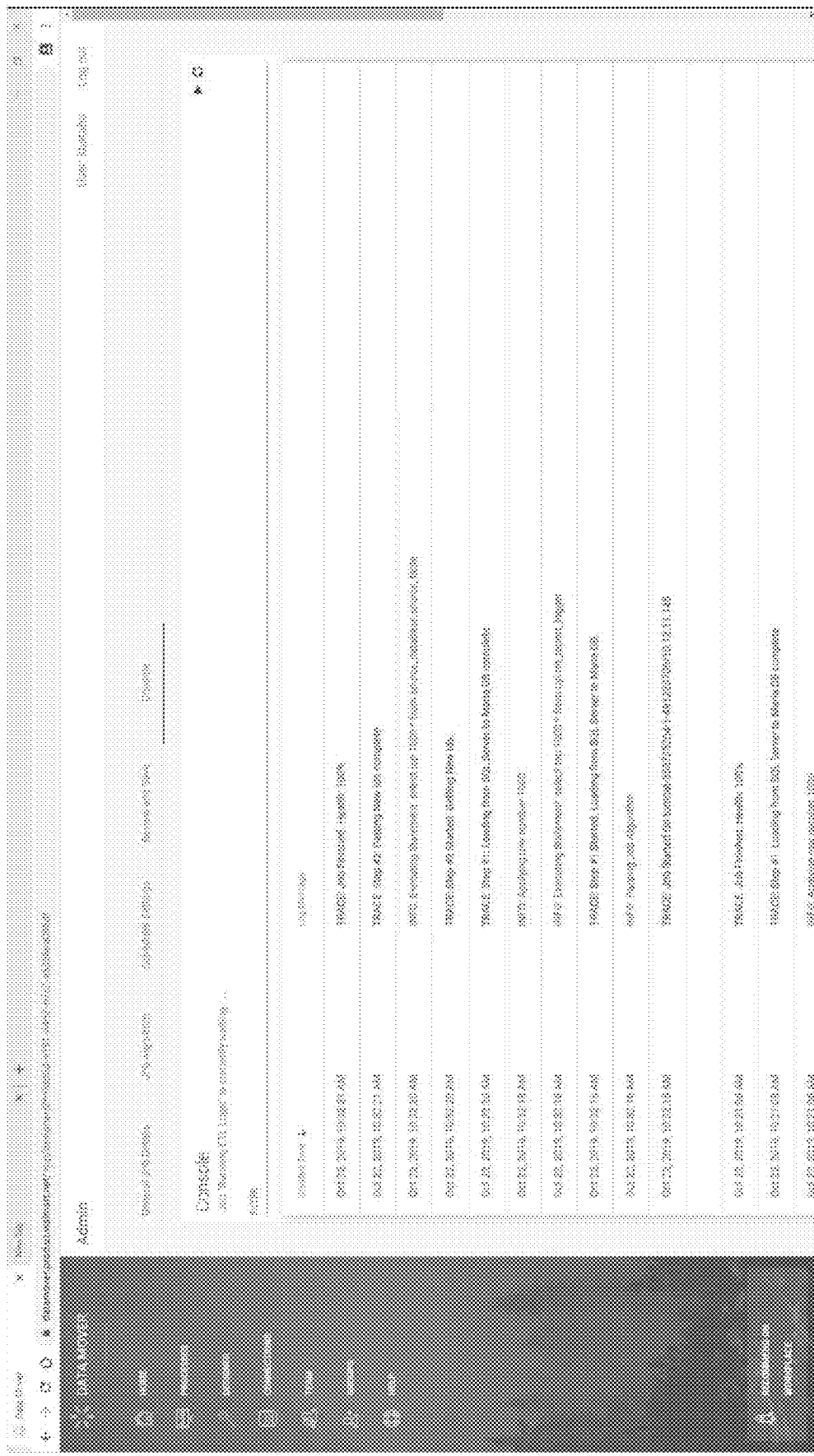

FIG. 10E is a screenshot of a log interface. For example, the user can view each log message relative to a timestamp.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for data replication, the system comprising:
computing hardware of at least one processor and memory operably coupled to the at least one processor; and
instructions that, when executed on the computing hardware, cause the computing hardware to implement:
a user interface configured to receive a data fusion algorithm from a user, and a request to execute a job from a plurality of jobs, each of the jobs including instructions to copy data from one of a plurality of source databases to one of a plurality of target databases, and
a plurality of virtual machines, each virtual machine comprising:
a processing unit configured to:
attempt to start the job requested by the user,
when the job can be started, lock the job from the rest of the plurality of virtual machines, and
execute the job according to the data fusion algorithm using a random access memory (RAM) memory bucket.

2. The system of claim 1, wherein the processing unit is further configured to:
parse the data fusion algorithm into a plurality of steps;
validate the plurality of steps; and
when an error is determined in the validation of one of the plurality of steps, recommend an alternative step.

3. The system of claim 2, wherein the plurality of steps are saved on the virtual machine as a binary object.

4. The system of claim 2, wherein the error is a missing table on the target database and the alternative step is a suggested alternative table.

5. The system of claim 1, wherein each virtual machine further comprises:
a scheduling unit configured to monitor job status by checking the status of the plurality of jobs and presenting the status to the user through the user interface.

6. The system of claim 5, wherein the scheduling unit is configured to monitor job status every second.

7. The system of claim 5, wherein the scheduling unit is further configured assign overdue jobs to another of the plurality of virtual machines based on the monitoring of job status.

8. The system of claim 1, wherein the processing unit is further configured to:
receive a result set object for the job;
convert the result set object from a source database datatype to a target database datatype; and
write the result set object to the target database in the target database datatype.

9. The system of claim 1, wherein the processing unit is further configured to:
parse the data fusion algorithm into a plurality of steps;
determine whether a first step in the plurality of steps requires user confirmation;
when the first step requires user confirmation, present a first step confirmation to the user through the user interface and receive a first step confirmation from the user; and
execute the first step.

10. The system of claim 1, wherein the processing unit is further configured to:
read a row from the source database;
determine if the target database is executing a batch write;
when the target database is executing a batch write, add the row to the memory bucket;
when the target database is not executing a batch write, determine if the memory bucket is empty;
when the memory bucket is not empty, add the row to the memory bucket; and
when the memory bucket is empty, add the row to the target batch write.

11. A method of data replication, the method comprising:
receiving, through a graphical user interface from a user, a data fusion algorithm and a request to execute a job from a plurality of jobs, each of the jobs including instructions to copy data from one of a plurality of source databases to one of a plurality of target databases;
presenting a plurality of virtual machines, each virtual machine configured with a processing unit;
attempting to start the job requested by the user using one of the plurality of virtual machines;
when the job can be started, locking the job from the rest of the plurality of virtual machines, and
executing the job according to the data fusion algorithm using a random access memory (RAM) memory bucket.

12. The method of claim 11, further comprising:
parsing the data fusion algorithm into a plurality of steps;
validating the plurality of steps; and
when an error is determined in the validation of one of the plurality of steps, recommending an alternative step.

13. The method of claim 11, further comprising:
receiving a result set object for the job;
converting the result set object from a source database datatype to a target database datatype; and
writing the result set object to the target database in the target database datatype.

14. The method of claim 11, further comprising:
parsing the data fusion algorithm into a plurality of steps;
determining whether a first step in the plurality of steps requires user confirmation;
when the first step requires user confirmation, presenting a first step confirmation to the user through the user interface and receiving a first step confirmation from the user; and
executing the first step.

15. The method of claim 11, further comprising:
reading a row from the source database;
determining if the target database is executing a batch write;
when the target database is executing a batch write, adding the row to the memory bucket;
when the target database is not executing a batch write, determining if the memory bucket is empty;
when the memory bucket is not empty, adding the row to the memory bucket; and
when the memory bucket is empty, adding the row to a target batch write.

16. A method of optimized communication between a source database and a target database, the method comprising:
generating an optimized timeslot during a read-write operation between the source database and the target database by:
reading a first result set of data from the source database,
writing the first result set of data to the target database using a direct push,
while writing the first result set of data to the target database, reading a second result set of data from the source database.

17. The method of claim 16, further comprising presenting a memory bucket and storing the second result set of data in the memory bucket, wherein the memory bucket is an array of objects in random access memory (RAM).

18. The method of claim 17, further comprising:
writing the second result set of data from the memory bucket to the target database using a direct push; and
while writing second result set of data from the memory bucket to the target database, reading a third result set of data from the source database.

19. The method of claim 18, wherein reading the second result set of data is conducted at a maximum read speed allowed by the source database, and writing the second result set of data is conducted at a maximum write speed allowed by the target database.

20. The method of claim 17, wherein reading the second result set of data comprises:
reading a row from the source database;
determining if the target database is executing a batch write;
when the target database is executing a batch write, adding the row to the memory bucket;

when the target database is not executing a batch write, determining if the memory bucket is empty;

when the memory bucket is not empty, adding the row to the memory bucket; and when the memory bucket is empty, adding the row to the target batch write method.

\* \* \* \* \*